(12) United States Patent
Wang et al.

(10) Patent No.: US 7,298,565 B2
(45) Date of Patent: Nov. 20, 2007

(54) COMPACT AND HIGH PERFORMANCE OPTO-MECHANICAL SWITCH

(75) Inventors: Yong Jian Wang, Saratoago, CA (US); Feng Ye, Alameda, CA (US)

(73) Assignee: AC Photonics, Santa Clara, CA (US)

( * ) Notice: Subject to any disclaimer, the term of this patent is extended or adjusted under 35 U.S.C. 154(b) by 0 days.

(21) Appl. No.: 11/249,888

(22) Filed: Oct. 12, 2005

(65) Prior Publication Data

US 2006/0132938 A1      Jun. 22, 2006

(51) Int. Cl.
*G02B 5/04* (2006.01)

(52) U.S. Cl. ...................................... 359/834
(58) Field of Classification Search ............... 359/833, 359/834
See application file for complete search history.

(56) References Cited

U.S. PATENT DOCUMENTS

| | | | |
|---|---|---|---|
| 6,219,474 B1 | 4/2001 | Cai et al. | 385/24 |
| 6,463,189 B1 | 10/2002 | Wu et al. | 385/16 |
| 6,477,289 B1 | 11/2002 | Li | 385/16 |
| 6,493,139 B1 | 12/2002 | Liu et al. | 359/484 |
| 6,707,960 B2 | 3/2004 | Li et al. | 385/18 |
| 7,058,255 B1 * | 6/2006 | Fang | 385/22 |
| 2002/0009254 A1 * | 1/2002 | Sui | 385/16 |

* cited by examiner

*Primary Examiner*—Euncha P. Cherry
(74) *Attorney, Agent, or Firm*—Sawyer Law Group LLP

(57) ABSTRACT

A 2×2 opto-mechanical switch is disclosed. A first embodiment of the present invention utilizes a transmitting compact parallel prism and four or two pieces of the 45-degree prism to increase the beam separation. The compact parallel prism keeps a much smaller load to the relay arm. This makes the current invention less sensitive to the ambient shock and vibration. A second embodiment of the present invention utilizes a similar transmitting compact parallel prism and two wedge prisms which has similar advantages. The compact prism applies a small loading force to the relay arm. Both of these embodiments also feature superior thermal and mechanical stability.

An opto-mechanical switch in accordance with the present invention utilizes a transmitting design and thus is more stable to ambient thermal or mechanical change. The embodiments of the present invention also feature much better repeatability than the conventional 2×2 optical switches.

1 Claim, 3 Drawing Sheets

Compact prism with four beam shifting 45-degree prisms (current art)

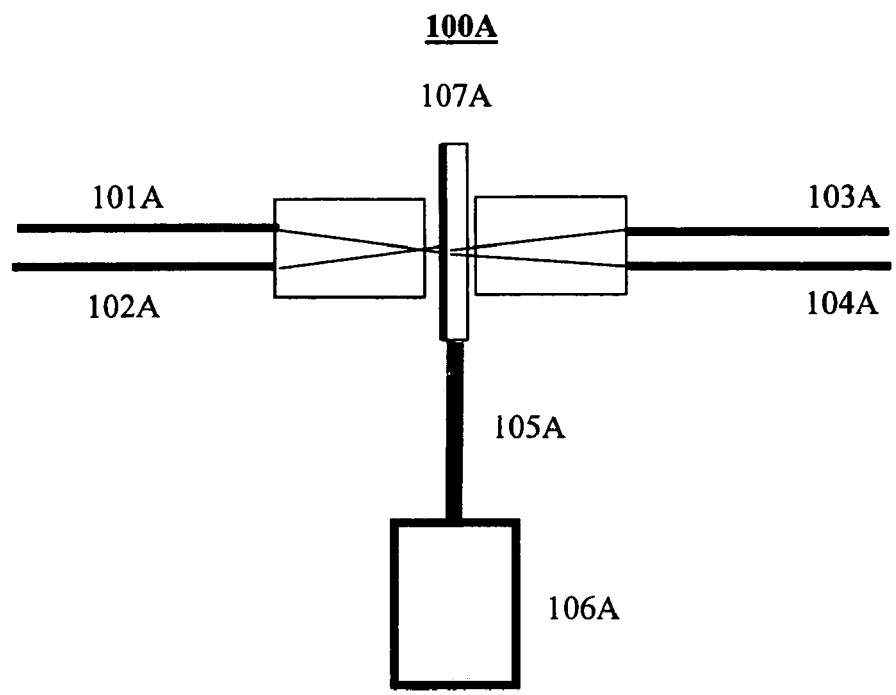
Figure 1A. Reflection mirror 2x2 switch (prior art)
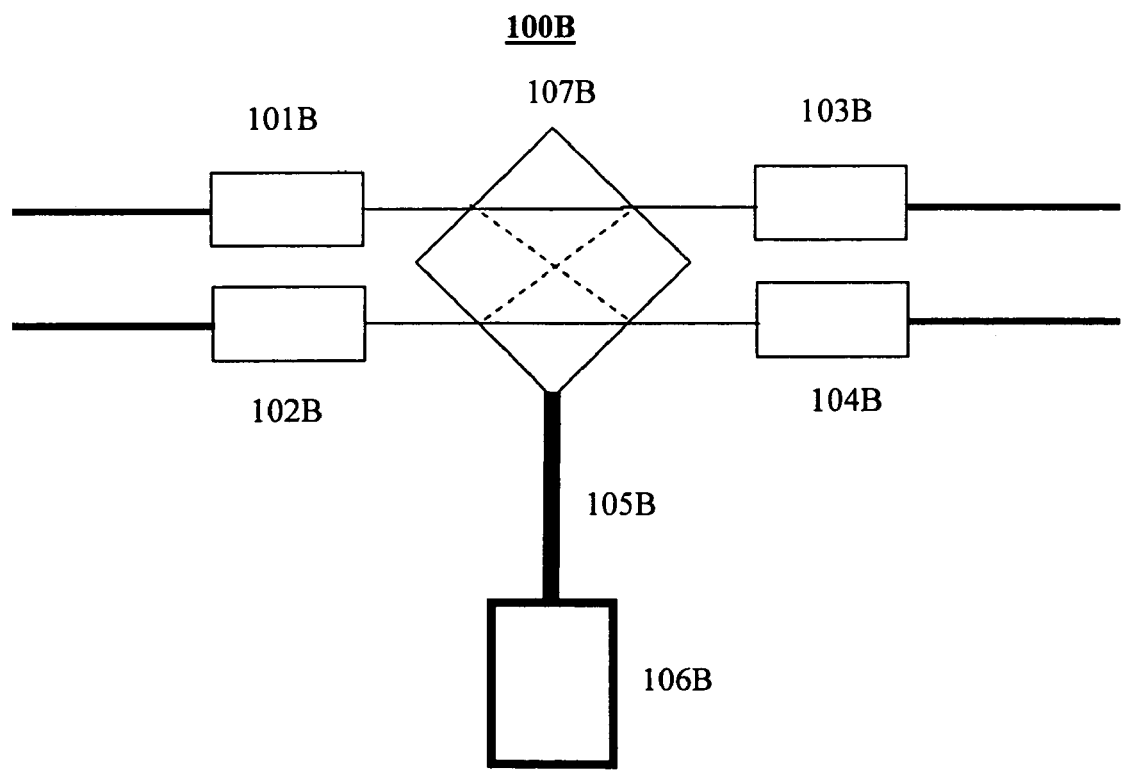
Figure 1B. Single prism 2x2 switch (prior art)

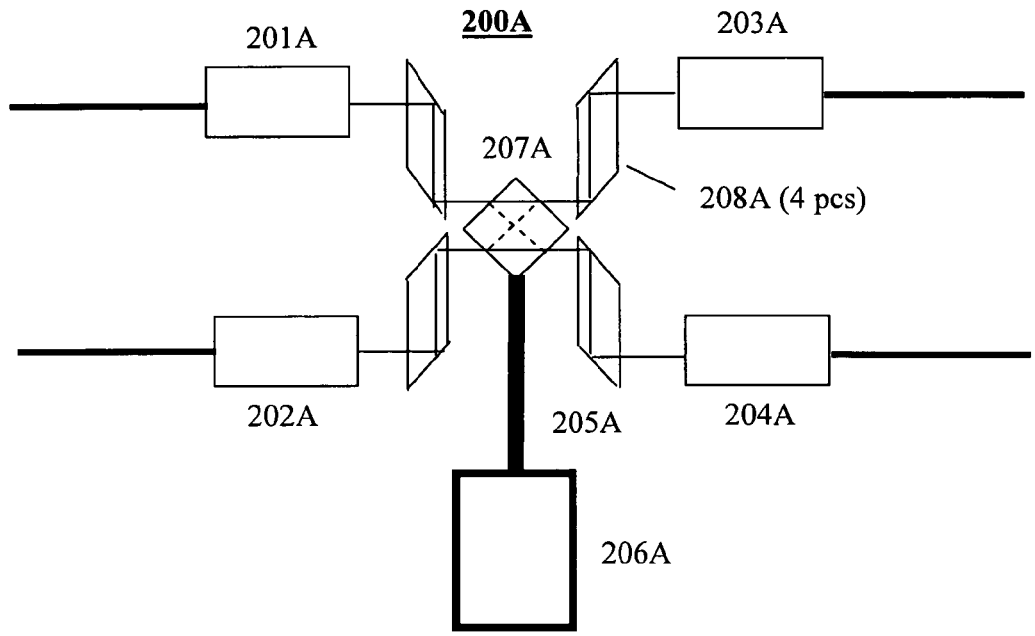
Figure 2A. Compact prism with four beam shifting 45-degree prisms (current art)
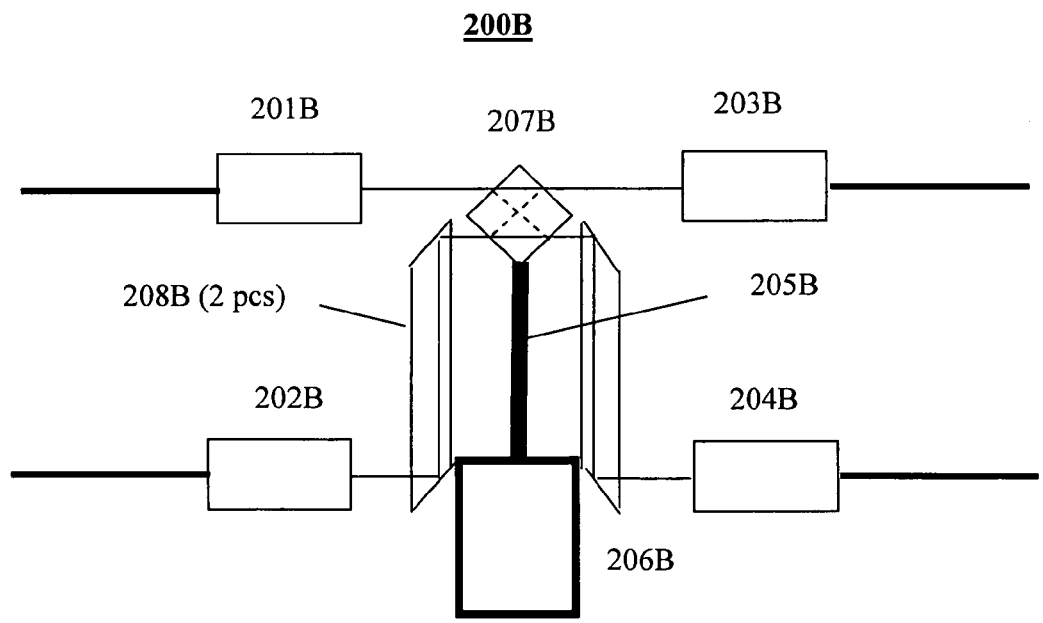
Figure 2B. Compact prism with two beam shifting 45-degree prisms (current art)

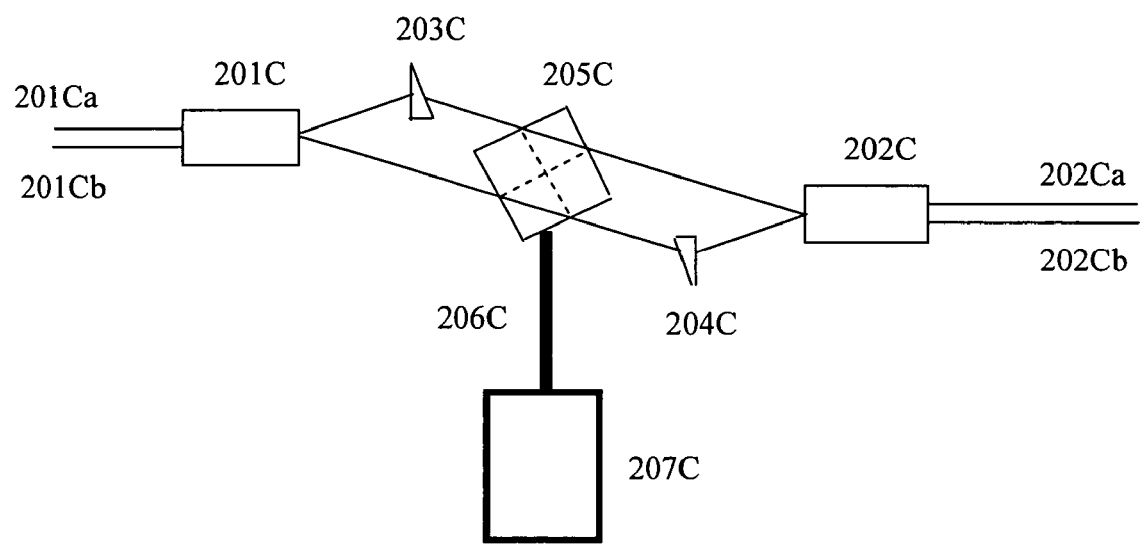
Figure 2C. Compact prism with two wedge prisms

COMPACT AND HIGH PERFORMANCE OPTO-MECHANICAL SWITCH

FIELD OF THE INVENTION

The present invention relates generally to opto-mechanical switches and more specifically to compact and high performance switches.

BACKGROUND OF THE INVENTION

Opto-mechanical switches are used in routing signals from one port to another port. Opto-mechanical switches are the critical building element in fiber optical communication networks and in other fields such as test and measurement.

Compact and stable 2×2 opto-mechanical switches are desirable as the technology shrinks in size and increases in bandwidth. A first embodiment of a conventional 2×2 opto-mechanical switch utilizes a reflection mirror with two dual fiber collimators, which is highly unstable thermally and mechanically. A second embodiment of a conventional 2×2 opto-mechanical switch utilizes a transmitting parallel prism which increases the thermal and mechanical stability. The second embodiment also has better repeatability of performance over the first embodiment. However, in order to keep a workable beam separation for aligning the collimator optics, the size of the prism is relatively large. Therefore, the prism is heavy and places a heavy load on the carrying relay arm.

Accordingly, what is needed is a system and method for overcoming the above-identified issues. The present invention addresses such a need.

SUMMARY OF THE INVENTION

A 2×2 opto-mechanical switch is disclosed. A first embodiment of the present invention utilizes a transmitting compact parallel prism and four or two pieces of the 45-degree prism to increase the beam separation. The compact parallel prism keeps a much smaller load to the relay arm. This makes the current invention less sensitive to the ambient shock and vibration. A second embodiment of the present invention utilizes a similar transmitting compact parallel prism and two wedge prisms which has similar advantages. The compact prism applies a small loading force to the relay arm. Both of these embodiments also feature superior thermal and mechanical stability.

An opto-mechanical switch in accordance with the present invention utilizes a transmitting design and thus is more stable to ambient thermal or mechanical change. The embodiments of the present invention also feature much better repeatability than the conventional 2×2 optical switches.

BRIEF DESCRIPTION OF THE DRAWINGS

FIG. 1A is a diagram of a first embodiment of a conventional 2×2 opto-mechanical switch, which uses a reflection mirror and a pair of dual fiber collimators.

FIG. 1B is a diagram of a second embodiment of a conventional 2×2 opto-mechanical switch, which uses a large size parallel prism and four pieces of the single fiber collimators.

FIG. 2A is a diagram of a first embodiment of a 2×2 opto-mechanical switch in accordance with the present invention.

FIG. 2B is a diagram of a second embodiment of a 2×2 opto-mechanical switch in accordance with the present invention.

FIG. 2C is a third embodiment of a 2×2 opto-mechanical switch in accordance with the present invention.

DETAILED DESCRIPTION

The present invention relates generally to opto-mechanical switches and more specifically to compact and high performance switches. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

FIG. 1A shows a first embodiment 100A of a conventional 2×2 opto-mechanical switch. The opto-mechanical switch 100A comprises a reflection mirror 107a, a pair of dual fiber collimators 108A and 109A, collimator fibers 101A, 102A, 103A, and 104A are collimator fibers, a piece of metal arm 105A and a relay 106A. The metal arm 105A has one side attached to the reflection mirror 107A and the other side attached to the relay 106A. When a DC voltage is applied, the reflection mirror 107a can be either in or out of the optical paths and thus 2×2 optical switching can be realized.

If the mirror 107A is out of the optical paths, the light signal from collimator fiber 101A goes to collimator fiber 104A, and the light signal from collimator fiber 102A goes to collimator fiber 103A. If the reflection mirror 107A is in the optical paths, the light signal from collimator fiber 101A goes to collimator fiber 102A and the light signal from collimator fiber 103A goes to collimator fiber 104A. When the reflection mirror 107A is in the optical paths, the optical signals are very sensitive to the non-repeating or dislocation of the reflection mirror 107A and thus the embodiment shown in FIG. 1A is not stable thermally and mechanically.

FIG. 1B shows a second embodiment 100B of a conventional 2×2 opto-mechanical switch. The opto-mechanical switch 100B comprises a parallel prism 107B, single collimators 101B, 102B, 103B and 104B, and a relay 106B. The opto-mechanical switch 100B utilizes a bulky and large size parallel prism 107B to exchange the light signals. Four single collimators 101B, 102B, 103B, and 104B are utilized. When the parallel prism 107B is in the optical paths, the light signal from collimator 101B goes to collimator 104B and the light signal from collimator 102B goes to collimator 103B. The large size prism 107B is attached to the thin arm 105B while the arm 105B is attached to the relay 106B. The reason for the large size of the parallel prism 107B is to separate the two beams of light signals as much as possible in order to make the bonding of the four collimators 101B, 102B, 103B and 104B easier. However, the relatively large size and weight of the parallel prism 107B can cause a large load on the relay 106B and thus make the device more vulnerable to ambient shock and vibration or other seismic activity.

FIG. 2A shows a first embodiment 200A of a 2×2 opto-mechanical switch in accordance with the present invention. The opto-mechanical switch 200A comprises a parallel prism 207A, four pre-fixed 45-degree prisms 208A, collimators 201A, 201A, 203A and 204A, a metal arm 205A and a relay 206A. The opto-mechanical switch 200A utilizes a smaller parallel prism 207A and thus makes the device less vulnerable to ambient shock and vibration. The beam separation function is achieved through the four pre-fixed 45-degree prisms 208A. The light passing through the 45-degree prism 208A makes two total internal reflections and comes out with a parallel beam and certain distance of the shift.

FIG. 2B shows a second embodiment of a 2×2 opto-mechanical switch 200B in accordance with the present invention. The opto-mechanical switch 200B comprises a parallel prism 207B, 45-degree prisms 208B, collimators 201B, 202B, 203B and 204B and relay 206B. The opto-mechanical switch 200B utilizes the compact parallel prism 207B and two portions of each of the 45-degree prisms 208B to shift the beams and thus increases the collimator separation. Two longer portions of the 45-degree parallel prisms 201B, 202B, 203B and 204B are utilized. Therefore, the switch 200B of the present invention is less costly than the first embodiment shown in FIG. 2A. The switch 200B shown in FIG. 2B saves two pieces of the 45 degree prisms 208B in comparison with the switch shown in FIG. 2A.

FIG. 2C is a third embodiment of a 2×2 opto-mechanical switch 200C in accordance with the present invention. The opto-mechanical switch 200C comprises a parallel prism 205C, wedge prisms 203C and 204C, collimators 201C and 202C*s,* collimator fibers 201C*a*, 201C*b*, 202C*a*, and 202C*b*, and relay 207C. The opto-mechanical switch 200C utilizes a smaller parallel prism 205C and thus makes the mechanism less vulnerable to ambient shock and vibration. The beam separation function is achieved through two wedge prisms 203C and 204C. The light from collimator 201C*b* will pass through 203C wedge prism which deflects the beam to be parallel to the light from collimator fiber 201C*a* after exiting collimator 201C. Wedge prism 204C converts the beam back to make an angle relative to the neighboring beam. The smaller parallel prism 205C is utilized to exchange the two beams as in the previous art. The prisms' 203C and 204C top angle is designed in a way that the beam deflects an angle equal to the beam angle exiting the collimator. The third embodiment in accordance with the present invention, as shown in FIG. 2C, compares more favorably in shock and vibration performance to the conventional opto-mechanical switches.

An opto-mechanical switch in accordance with the present invention utilizes a transmitting design and thus is more stable to ambient thermal or mechanical change. The embodiments of the present invention also feature much better repeatability than the conventional 2×2 optical switches.

Finally, the embodiments of the present invention provide better shock and vibration performance than the embodiments of the conventional opto-mechanical switches.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A 2×2 opto-mechanical switch comprising:
two wedge prisms for providing beam separation by converting two parallel beams into two beams with an angle;
a parallel prism for receiving the two beams with an angle from the two wedge prisms;
two of collimators for directing the two beams from the two wedge prisms, wherein the plurality of collimators output beam matches the beam angle from the two wedge prisms;
an arm coupled to the parallel prism; and
a relay coupled to the arm.

* * * * *